Aug. 25, 1964        A. A. DICKE        3,145,634
PHOTOGRAPHIC CAMERA WITH UNITARY SHUTTER AND DIAPHRAGM
Filed May 21, 1959                    5 Sheets-Sheet 1

INVENTOR.
Allen A. Dicke

Aug. 25, 1964   A. A. DICKE   3,145,634
PHOTOGRAPHIC CAMERA WITH UNITARY SHUTTER AND DIAPHRAGM
Filed May 21, 1959   5 Sheets-Sheet 4

INVENTOR.
Allen A. Dicke

United States Patent Office 3,145,634
Patented Aug. 25, 1964

3,145,634
PHOTOGRAPHIC CAMERA WITH UNITARY
SHUTTER AND DIAPHRAGM
Allen A. Dicke, R.R. 1, New Bremen, Ohio
Filed May 21, 1959, Ser. No. 814,704
21 Claims. (Cl. 95—42)

This invention relates to a photographic camera with unitary shutter and diaphragm and has for an object to provide a camera having a single set of light intercepting elements such as pivoted blades, preferably located between the forward and rearward lens elements, which light intercepting elements may be opened fully, as for focusing, be closed fully prior to and after an exposure and may during exposure be wholly or partly opened to provide the desired exposure aperture, for a predetermined period, to provide the desired length of exposure.

Photographic camerias as heretofore made are provided with (1) a shutter which may be opened for a predetermined time to permit the image to reach the photo sensitive means and (2) a diaphragm usually made of a plurality of pivoted blades which may be adjusted to vary the size of the opening in the lens so as to vary the diameter of the aperture of the lens. The diaphragm is necessary for controlling the depth of field and also to reduce the effective light as required. In these prior cameras, the diaphragm blades swing from an outward (maximum aperture) position inwardly to provide various reduced apertures. They never close entirely. The shutter blades swing from a fully open position to a fully closed position to completely exclude light. Both mechanisms are usually placed between the forward and rearward lens elements.

It is an object of the present invention to combine the functions of diaphragm and shutter in one set of parts, the mechanism in its simplest form being so arranged that the diaphragm-shutter parts are normally closed but may be opened when an exposure is made (to an extent determined by a previously adjusted stopping down mechanism) and are thereafter closed fully after a pre-determined exposure time has elapsed.

Another object is to provide a single lens reflex camera having a unitary diaphragm shutter mechanism in which, when the camera is ready to make an exposure, the diaphragm-shutter blades are fully open to permit focusing and viewing the scene to be photographed and in which the diaphragm-shutter blades are thereupon closed fully to permit the viewing mirror to be moved out of the way, after which the the shutter blades are opened to a pre-determined extent to provide the desired exposure aperture and after which the blades are fully closed after a pre-determined interval.

Another object is to provide a single lens reflex camera having a diaphragm and a shutter incorporated in the lens mechanism and separate means for driving said diaphragm and said shutter extending to the camera body, together with a unitary mechanism within the camera body detachably connected for operating said shutter and diaphragm in such a way that both shutter and diaphragm are normally open, that the shutter is then fully closed and the mirror is moved to ineffective position while the diaphragm is being closed to a pre-determined extent, whereupon the shutter is opened fully, remains open for a pre-determined exposure period and is then closed, whereupon the mirror is restored to effective position and then the shutter and diaphragm are each opened fully.

Other objects are to provide a camera having a detachable lens structure including diaphragm-shutter blades together with connecting means to operate said shutter blades by mechanism within the body of the camera whereby the lens units contain a minimum of mechanism.

Another object is to provide such a camera provided with a turret for supporting a plurality of lenses which may be successively brought into effective position at which position the diaphragm-shutter mechanism of the effective lens is connected with the operating mechanism within the camera body.

Other objects are to provide suitable mechanisms for giving the desired motions to the diaphragm-shutter blades.

Another object is to provide suitable interlock means which will prevent the operation of the camera mechanism unless and until the lens is located in proper relationship to the camera body.

Another object is to provide means to prevent the positioning of the lens on the camera body unless the camera mechanism is correctly positioned for making an exposure.

Further objects and advantages of this invention will be apparent from consideration of the specification as illustrated by the accompanying drawings of possible embodiments of the invention, in which drawings:

FIG. 11A' is a top view of the parts shown in FIG. 11A;

FIG. 11B' is a top view of the parts shown in FIG. 11B; and

Figure 1:
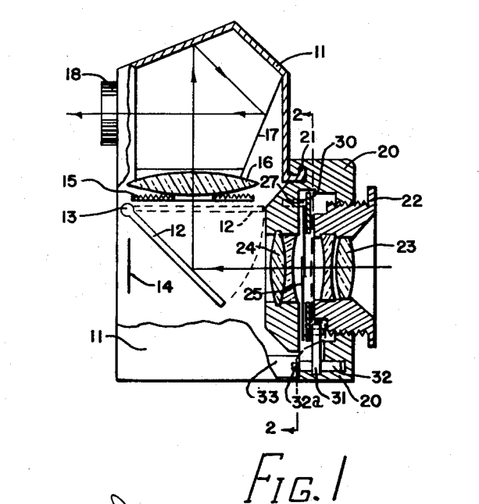
FIG. 1 is a view from the right side of a camera mechanism illustrating the invention and constitutes a cross-section on the line 1—1 of FIG. 2 with the exception that the cross-section of the lens unit is taken on the line 1L—1L of FIG. 2.

Referring to said drawings, 11 is the camera body within which is the mirror 12 pivoted at 13 and normally positioned as shown but swingable upwardly into a horizontal plane (dotted line position). 14 is the image plane where the light sensitive sheet is located. Above the mirror is a Fresnel lens 15, the lower surface of which is frosted. Above this is the condenser lens 16. Above the latter is the usual pentaprism 17. To the rear of the latter is the finder eye piece 18. These parts, in the positions shown permit the user to do through the lens viewing and focusing, the image being exactly the same as the image which will later strike the light sensitive surface.

20 indicates the lens barrel detachably connected to the body 11 at 21 by any suitable means of the type in which the lens barrel is rotated into place and suitably locked in place, as by threads or bayonet joint. Threaded into the lens barrel is the lens body 22 which supports the forward lens group 23 relative to the rear lens group 24. This threaded connection permits focusing.

Figures 2, 3:
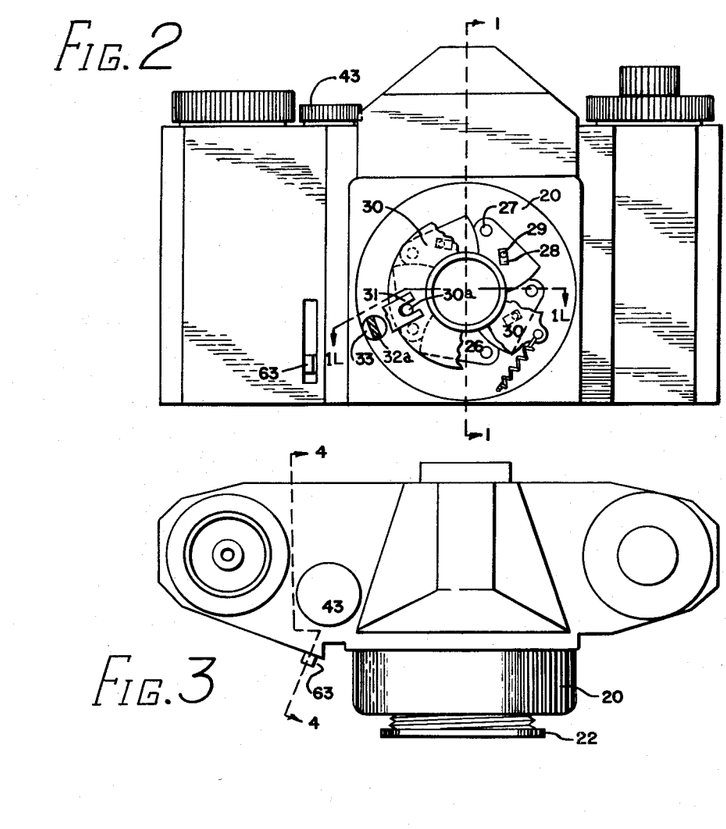
FIG. 2 is a front elevation.
FIG. 3 is a top plan view.

These lens groups are spaced and in said space is located the diaphragm-shutter mechanism generally designated 25. Referring also to FIG. 2, there are shown five blades 26 each pivoted at 27 to the stationary lens body 20 and each is provided with a slot 28. Within each of said slots is one of five pins 29 carried by a rotatable ring 30 having a pin 30a embraced by the bifurcated end of a crank 31 on the end of a shaft 32 journalled near the edge of the lens barrel 20. This shaft extends rearwardly where it is formed with a segmental tongue 32a. This tongue is received in a slot in a rotatable socket 33 in the camera body.

The tongue 32a of shaft 32 is arcuate in form, the center of curvature being in the center of the lens body 20. The socket 33 is similarly slotted so as to snugly receive the tongue 32a. Thus, when the lens body is attached to the camera by screw thread or bayonet joint, the tongue 32a comes to rest in its mating arcuate slot in socket 33.

Figures 4, 5, 6:
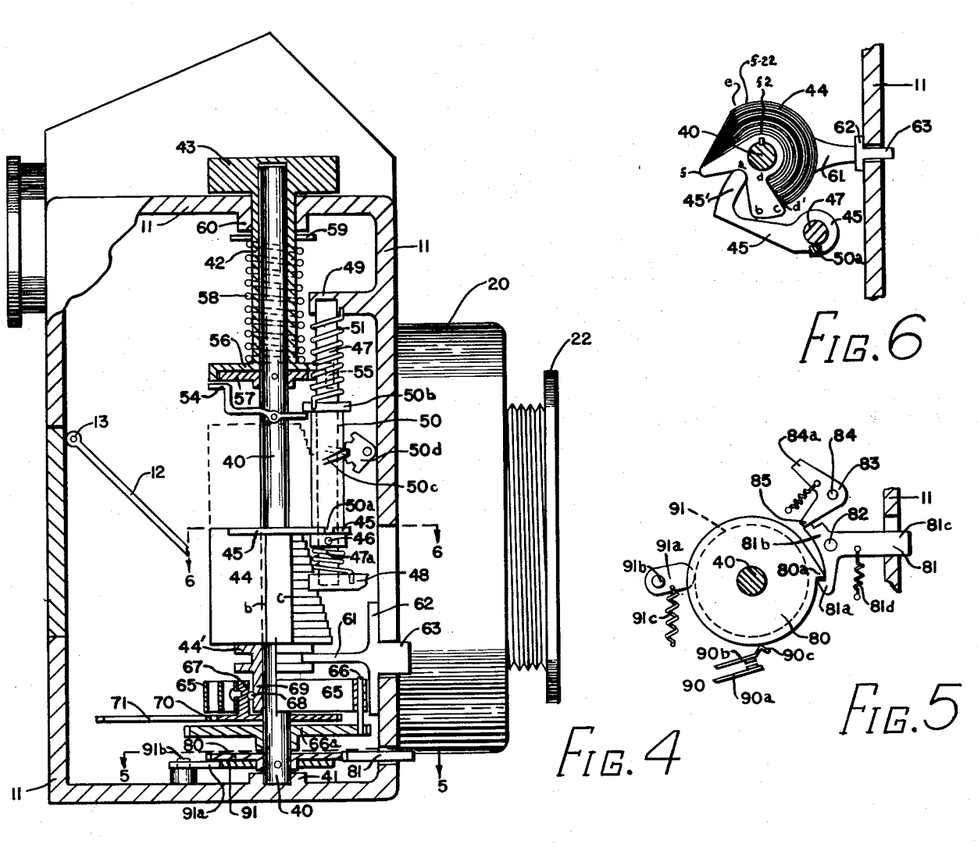
FIG. 4 is a vertical cross-section taken on the line 4—4 of FIG. 3 showing one type of mechanism for operating the diaphragm-shutter blades.
FIG. 5 is a partial cross-section on the line 5—5 of FIG. 4.
FIG. 6 is a partial horizontal cross-section on the line 6—6 of FIG. 4.

Located within the camera body is a mechanism for suitably rotating the socket 33. One form of mechanism for this purpose is shown in FIGS. 4 and 6. In said figures, 40 represents a vertical shaft located to the right of the lens area. It is journalled at the bottom end in a socket 41 in the casing 11 and at its upper end in a bushing 42 formed with a knob 43. Feather-keyed or splined to said shaft 40 is a cam 44 of the peripheral form shown in FIG. 6, cooperating with an arm 45 fixed at 46 on a shaft 47 journalled at 48 and 49 in lugs extending from the camera housing. Spiral spring 47a is connected between lug 48 and shaft 47 to bias the latter in a clockwise direction as viewed from above. Surrounding said shaft 47 is a sleeve 50 having a projection 50a normally extending into a recess in the arm 45 (FIGS. 4 and 6). Also surrounding shaft 47 above sleeve 50 is a helical spring 51 weaker than spring 47a and so connected between the sleeve 50 and the lug 49 as to bias sleeve 50 downwardly and in a counter-clockwise direction as viewed from above.

Attached to the shaft 40 is a washer 57 having peripheral serrations engaging in mating serrations in a downwardly extending flange on disc 56. 58 is a spring bearing at its upper end against a washer 59 bearing against the hub 60 on the casing 11. Said spring 58 bears at its lower end upon the disc 56. The latter is provided with a downwardly extending cam lug 55. It will be seen that by pulling up the knob 43, it, together with the bushing 42 and disc 56, may be turned to various positions to change the angular position of the cam lug 55 relative to the axis of shaft 40. In this way, the time of shutter closing may be varied as will be described.

The nose 45' of lever 45 is normally in the position shown in FIG. 6 (diaphragm-shutter open fully) where it bears at a on a cylindrical portion of the cam 44. Assuming that the cam 44 is in its downward position as shown in FIG. 4 and that shaft 40 is rotated clockwise (FIG. 6) the arm 45 will during the first 30° of movement be forced counter-clockwise so that it bears at the point b. This causes sleeve 50 to be rotated counter-clockwise a certain number of degrees (through projection 50a). Rotation of sleeve 50, through connections to be described later, causes the socket 33 to be rotated to such an extent as to cause the diaphragm-shutter blades to be fully closed. The cam 44 is cylindrical from b to c (from 30 to 70 degrees), after which the finger 45', through action of spring 47a, drops down to contact the cam at d, thus opening the shutter to its full extent (in the downward position of cam 44). The cam 44 is circular from d to e after which the radii of all parts of cam 44 increase to f where the radii are all the same.

After some variable period after finger 45 has contacted at d, the cam lug 55 strikes the left end of lever 54, forcing it counter-clockwise so that its other end engages under flange 50b on the sleeve 50, thus lifting sleeve 50 and disengaging projection 50a from the notch in arm 45. This permits sleeve 50 to be rotated counter-clockwise by spring 51 to shutter closing position, terminating the exposure. Thereafter shaft 40 and cam 44 continue to rotate until nose 45' rests at e where shaft 40 and cam 44 are held by the mechanism shown in FIG. 5 and described later herein. When, during the film transport operation, the shaft 40 and cam 44 are released to complete their rotation to the position shown in FIGS. 5 and 6 the arm 45 is first cammed counter-clockwise by the projection f (which is of the same radial length along the entire axial extent of cam 44) to their extreme counter-clockwise position so that projection 50a can again enter the recess in arm 45. During the remaining movement of shaft 40 cam 44 is moved to the position shown in FIG. 6 during which time sleeve 50 is rotated clockwise to the position where the shutter-diaphragm blades 26 are fully open.

The operation described above provides for an exposure at full opening (assumed to be f2) because the cam 44 was assumed to be in its most downward position as shown in FIG. 4. If the cam 44 is slid upwardly on shaft 40 so that a higher part of the cam acts upon lever 45, the shutter opening at exposure time will be less. If the cam 44 is moved to its uppermost position as shown in dotted lines in FIG. 4, the largest part of the cam will control exposure opening so that the finger 45' can fall down only from c to d' which may be assumed as a shutter opening of value f22. The cam 44 is cylindrical in the area a, b, c and f so that the effect of those parts of the cam 44 on arm 45 is the same irrespective of the position of cam 44 along shaft 40. This assures that the shutter is normally fully open and then is fully closed, remaining closed from b to c, during which period the mirror 12 is swung up out of the way.

The cam 44 is shown as of stepped conformation and may be made of a series of flat stampings fastened together. However, the cam may be made of one solid piece either with stepped conformation or with a gradual change in radius (conical). The lower end of the cam structure is provided with a grooved collar 44' receiving a forked operating member 61 attached to a slide 62 having an operating knob 63 extending through a slot in the casing (see also FIGS. 2 and 3). Prior to an exposure operation the cam 44 is set into position by moving knob 63 upwardly or downwardly to the desired f value setting so that in the succeeding operation the shutter blades are (during exposure) opened only to a corresponding extent.

65 indicates a spiral spring anchored on pin 66 and connected at its inner end to a cup shaped member 67 journalled around shaft 40 and connected through a sprag 68 for driving collar 69 fixed on shaft 40 in one direction only. Member 67 may be extended outwardly as at 70 where it is formed with gear teeth meshing with gear teeth on gear or segment 71.

During the film transporting operation following an exposure, the gear 70 is given one full rotation in a rearward direction by gear or segment 71 to re-wind the spring 65. This can be done without rotating shaft 40 because of the one way drive provide with the spray 68. The film transport mechanism also includes means for returning the mirror 12 to the position shown in FIGS. 1 and 4 where it is latched by suitable known means, not shown. Means are provided so that when shaft 40 has moved 30° the latch is released to permit the mirror to spring upward out of the way.

Means are provided for transmitting the partial rotation of sleeve 50 to the socket 33. This may be any suitable gearing or linkage. One means may be by forming a gear tooth helically on sleeve 50 such as the tooth 50c which drivingly engages gear sector 50d which is drivingly connected to the socket member 33.

The anchor pin 66 for spiral spring 65 is shown mounted on a disc or arm 66a journalled on shaft 40. Through an adjusting knob (not shown) on the exterior of the camera casing the member 66a is rotatably adjusted through suitable gearing so as to adjust the tension of spring 65. This aids in setting the desired exposure time as it varies the rotative speed of shaft 40.

Referring to FIG. 5, the shaft 40 also carries a disc 80 fixed thereto, which disc has a tooth 80a with which there is normally engaged the hook 81a of a three armed lever 81, pivoted at 82. The arm 81b extends in a direction away from the hook 81a and is so arranged and dimensioned that when the lever is rocked counterclockwise far enough to allow the tooth 80a to escape from the hook 81a the end of arm 81b will intercept tooth 80a after disc 80 and shaft 40 have rotated, say 315°. 83 is a holding pawl pivoted at 84. It has an arm 85 adapted to spring behind the end 81b of lever 81 when the latter is rocked sufficiently far to permit tooth 80a to escape from hook 81a. This assures that when lever 81 is rocked, shaft 40 is released for a partial rotation only, say 315°. The third arm 81c of lever 81 extends through a slot in the casing 11 where it may be actuated by the user.

Suitable means are provided to rock holding pawl 83 at the end of the film transport operation. This releases lever 81 so that it is moved clockwise by spring 81d permitting tooth 80a to move from 315° to 360°. This causes arm 45, shaft 47 and sleeve 50 to rotate clockwise causing the rotation of socket 33 to open the diaphragm-shutter blades fully for viewing and focusing.

It may be desirable to prevent rearward rotation of shaft 40 (or 100) while the spring 65 is being rewound by rotation of gear 70. For this purpose, the disc 80 (FIGS. 4 and 5) may be formed with a cylindrical section 91 against which bears a sprag 91a pivoted at 91b and biased clockwise by spring 91c. This, or an equivalent arrangement, prevents such reverse rotation.

Referring again to FIG. 5, 90 represents generally a switch consisting of a stationary blade 90a and a movable blade 90b, the latter being formed with a nose 90c which may be engaged at a certain time by nose 80a. This closes a circuit adapted to energize a flash bulb or an electronic flash device.

In the form of diaphragm-shutter operating mechanism shown in FIGS. 4 and 6, the parts are so arranged that the main operating cam serves to force the diaphragm-shutter to closed position and later permits a spring to open the diaphragm-shutter to an extent permitted by aperture determining means for making the exposure. The exposure is terminated after a pre-determined time by interrupting the drive connection to the diaphragm-shutter operating socket.

The same results can be obtained by so arranging the parts that the main operating cam serves to force the diaphragm-shutter to fully open position and later to allow the diaphragm-shutter parts to move to fully closed position and then to force the diaphragm-shutter parts toward fully open position through a yielding spring connection so that the extent of opening may be limited by a settable aperture determining mechanism for making the exposure at the desired aperture. With such an arrangement, it is necessary to disable the aperture limiting mechanism so that the diaphragm-shutter may be opened at certain times fully for viewing and focusing. Such an arrangement is shown in the modified form shown in FIGS. 7, 8a, 8b and 8c. Therein shaft 100 (which is suitably spring driven by means which may be like those shown in FIG. 4 for driving shaft 40) carries a box cam 101 for rotation therewith. This cam is engaged by a roller 102a on arm 102 attached the sleeve 102c journalled on sleeve 33a attached to socket 33. Arm 102 is biased clockwise as by spring 102e. Firmly attached to socket sleeve 33a is the exposure opening control arm 104 which has a projection 104a bearing against a pin 102b on arm 102 to limit relative rotation in one direction. The cam 101 is so formed that in the normal position shown the arm 102 is forced away fully (open shutter position). During the first 30° of rotation of shaft 100 and cam 101 the arm 102 and roller 102a are forced toward shaft 100 by the outer edge of the box cam groove 101a aided by spring 102e to shutter closed position. Thereupon the mirror is released. Shortly thereafter (40 to 70°), the roller 102a and arm 102 are forced back to their original position opening the blades fully for an f2 exposure unless the extent of blade movement is limited by means described later.

Figures 7, 8A, 8B, 8C:
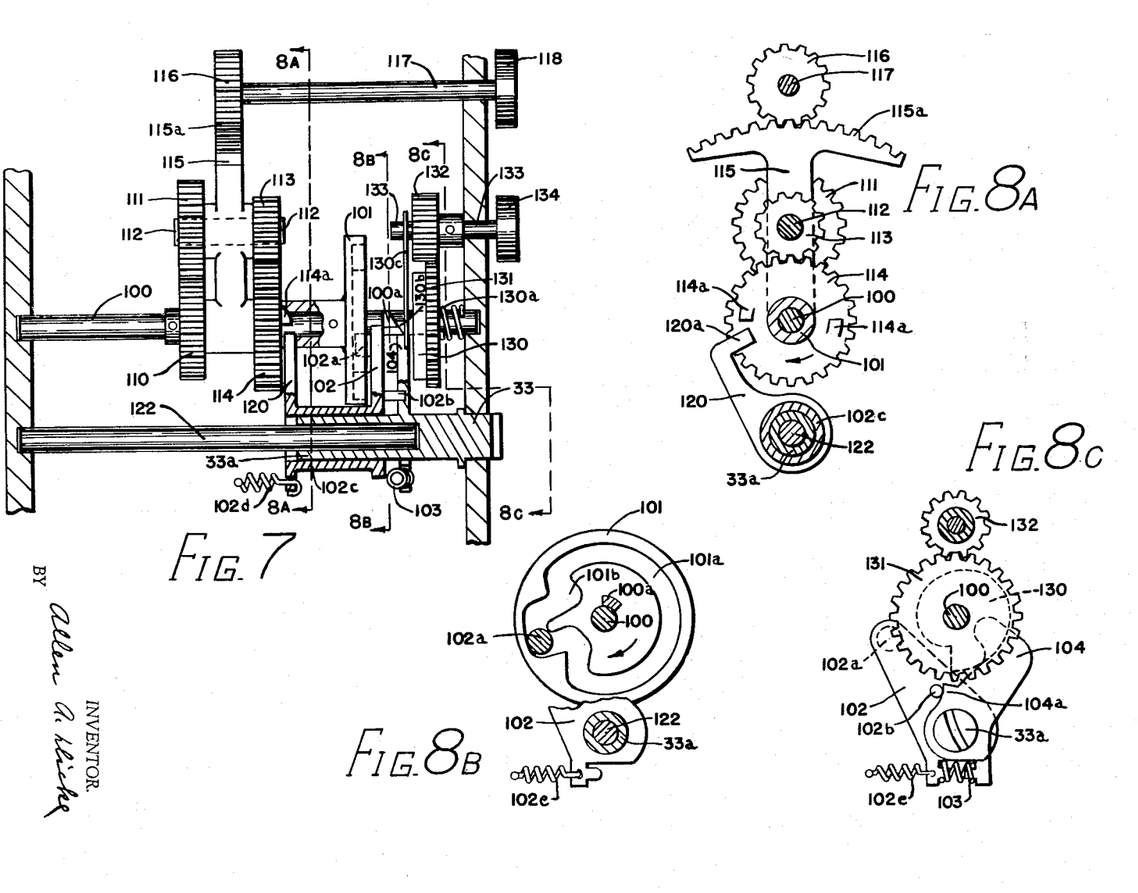
FIG. 7 shows in partial cross-section a modified mechanism for operating the diaphragm-shutter blades.
FIG. 8a is a cross-section taken on the line 8a—8a of FIG. 7.
FIG. 8b is a cross-section taken on the line 8b—8b of FIG. 7.
FIG. 8c is a cross-section taken on the line 8c—8c of FIG. 7.

The termination of the exposure time may be determined by the follow mechanism. Pinned on shaft 100 is a gear 110 meshing with a gear 111 of the same size drivingly connected through shaft 112 with smaller gear 113 which meshes with the larger gear 114 mounted loosely on shaft 100. The sizes of the gears are so chosen that final gear 114 makes, say, a one-half revolution for each turn of shaft 100. Gear 114 is provided with two cam lugs 114a, 180° apart. The shaft 112 is journalled in a planetary carrier segment 115 pivoted on shaft 110 and formed with teeth 115a engaged by a pinion 116 on shaft 117 extending through the camera casing and provided outwardly thereof with a graduated knob 118 which serves to preset the desired exposure time. The setting of knob 118 sets the position of planetary arm 115 causing gears 111 and 113 to planetate around gears 110 and 114 respectively. This causes gear 114 to be rotated reversely to adjust the position of cam lugs 14a around the shaft 100. Cam lugs 114a engage at certain times arm 120 attached to sleeve 102c which is slidably journalled on sleeve 33a but is normally held in the position shown as by spring 102d. The end of arm 120 is formed with a segmental finger 120a normally lying against gear 114. When one of the lugs 114a strikes finger 120a and forces it to the right, sleeve 102c, arm 102 and roller 102a are forced forwardly, disengaging roller 102a from cam 101 thereby permitting arm 102 to swing clockwise under the action of spring 102e to close the shutter and terminate an exposure. This action is effffected by the action of pin 102b on projection 104a.

The means shown for limiting the shutter opening during the exposure comprises a spiral control cam 130 preferably journalled on shaft 100. The position of cam 130 shown in FIG. 8c indicates about one-fourth exposure opening, say, f11. Adjacent to cam 130 and fixed thereto is a gear or segment 131 meshing with a wide face pinion 132 mounted on shaft 133. This shaft extends through the housing and is provided with a graduated aperture controlling adjustment knob 134.

The rotative position of knob 134 determines the rotative position of control cam 130, which therefore presents a predetermined radius to the arm 104 to determine aperture during exposure. Counter-clockwise movement of arm 104 is arrested when it strikes the periphery of the control cam 130. However, arm 102 is forced further counter-clockwise by cam 101, this being permitted by the one way drive connection between arms 102 and 104. During this additional movement spring 103 interposed between arms 102 and 104 is compressed further.

During the viewing and focusing preparatory to making an exposure the diaphragm-shutter must be fully open and it is therefore necessary to provide means to disable at this time the means for limiting the diaphragm-shutter opening. This may be done by the following means: The control cam 130 and its associated setting gear 131 are slidable on shaft 100, being biased rearwardly by spring 130a. The cam 130 and gear 131 are cammed forwardly, in the position shown in FIG. 7, by a cam lug 100a on shaft 100. This lug engages a lug 130b on a plate 130c which has a hole through which shaft 100 passes and which bears against the cam 130. This plate is prevented from rotating by any suitable means such as the rearward extension of shaft 133 passing through a hole in plate 130c.

It is to be understood that shaft 100 is spring impelled in the clockwise direction by spring motor means such as those shown in FIG. 4 for driving shaft 40 and that its rotation may be controlled by means such as those shown in FIG. 5. Also that the time control shaft 117 of FIG. 7 may, if desired, be geared to the gear 66 of FIG. 4 so that a single exposure duration setting means may be employed which increases the stress in driving spring 65 and thus increases the rotative speed of shaft 100 and at the same time varies the position of planetary carrier arm 115 to reduce the angular movement of shaft 100 required to terminate the exposure. Thus a wide variation in exposure timing may be achieved by the adjustment of a single setting knob. Other means, such as speed-responsive governor means of known or suitable type may, of course, be employed to vary the rotative speed of shaft 100.

Operation of the mechanism is as follows:

With the parts in the positions shown in FIGS. 7, 8a, 8b and 8c, the camera is sighted at the object to be photographed and the focus is adjusted. Lever arm 81c (FIG. 5) is moved counter-clockwise (to cause hook 81a to release tooth 80a) where it is locked by pawl 85. Thereupon shaft 100 is rotated by spring 65 through about 315°. During about the first 30°, arm 102 is moved clockwise its full extent by the box cam groove 101a, aided by spring 102e. During this motion arm 104 and the socket 33 attached thereto are rocked clockwise to close the diaphragm-shutter blades fully. Thereupon the mirror is released so that it springs up out of the way. Thereafter and from about 40° to 70° the arm 102 is forced counter-clockwise to its original position. In the meantime cam lug 100a has left lug 130b so that spring 130a has moved the cam 130 and gear 131 rearward so that arm 104 aligns with cam 130. Therefore when arm 102 is forced counter-clockwise arm 104 and socket 33 are moved counter-clockwise only until arm 104 strikes the periphery of cam 130, the balance of the movement being taken up by compression of spring 103. The diaphragm-shutter blades are now open to an extent determined by the rotative position of cam 130. With the cam 130 in the position shown in FIG. 8c this aperture is approximately one-fourth of the maximum. The exposure continues while the shaft 100 continues to rotate until lug 114a on gear 114 strikes finger 120a on arm 120. When this occurs, sleeve 102c and arm 102 are forced forwardly against the action of spring 102d so that roller 102a moves out of grove 101a in cam 101. Arm 102 is then pulled clockwise by spring 102e during which time pin 102b strikes projection 104a and forces arm 104 and socket 33 clockwise to close the diaphragm-shutter blades to terminate the exposure. Thereafter shaft 100 continues to rotate until stopped by arm 81b at 315°. At this time pin 102a engages in notch 101b in cam 101 so that upon further rotation of cam 101 (315° to 360°) the arm 102 will be restored to the position shown in FIGS. 8b and 8c.

When the film transport mechanism is operated the mirror is restored to the position shown in FIGS. 1 and 4 and thereafter pawl 83 (FIG. 5) is rocked clockwise by said mechanism. This allows shaft 100 to rotate its final 45°, forcing the arm 102 counter-clockwise to the position shown in FIGS. 8b and 8c where the diaphragm-shutter blades are fully open and the camera is ready for another operation.

It will be noted that instead of providing the lug 100a on shaft 100, the operation of moving the cam 130 and gear 131 forward could also be accomplished by the operation of the film transport mechanism but this would have to be done before arm 81b is released from nose 80a.

While cam 101 has been illustrated and described as a box cam, it is clear that it may equally well be made as a plate cam in which event spring 102e would have the full responsibility for moving the arm 102 clockwise to keep it in contact with the periphery of the plate cam 101.

The exposure terminating mechanism shown in FIGS. 4 and 6 has the disadvantage that the exposure time may be accidentally increased if rotation of knob 43 is interfered with. It may, therefore, be desirable to substitute for the exposure terminating mechanism shown in FIGS. 4 and 6 the exposure terminating mechanism shown in FIGS. 7, 8a, 8b and 8c.

The operations described above with respect to both general forms of construction causes the mirror to be in ineffective position at the end of the camera operation, the mirror being restored as an incident to the film transporting operation. In some cases, it is preferred to have the mirror returned to effective position during the picture taking operation so that the photographer can again see the scene as soon as possible after making the exposure. The two general forms of construction described above may be used in that manner. For that purpose, the mirror is restored to effective position by shaft 40 (or 100) at, say 315°. When the mirror arrives at its effective position where the film is protected, the mirror trips the pawl 83 which allows shaft 40 (or 100) to complete its rotation.

Figure 9:
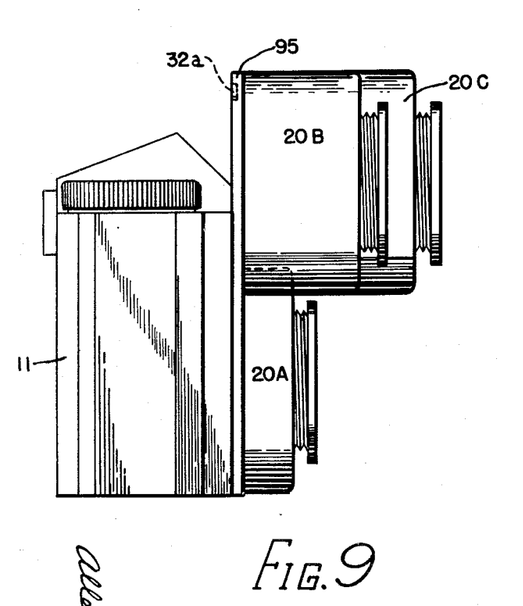
FIG. 9 is a side elevation of a camera provided with a three lens turret, the lenses and the diaphragm-shutter and the operating mechanism therefor within the camera body embodying the inventions of FIGS. 1 through 8c.
Figure 10:
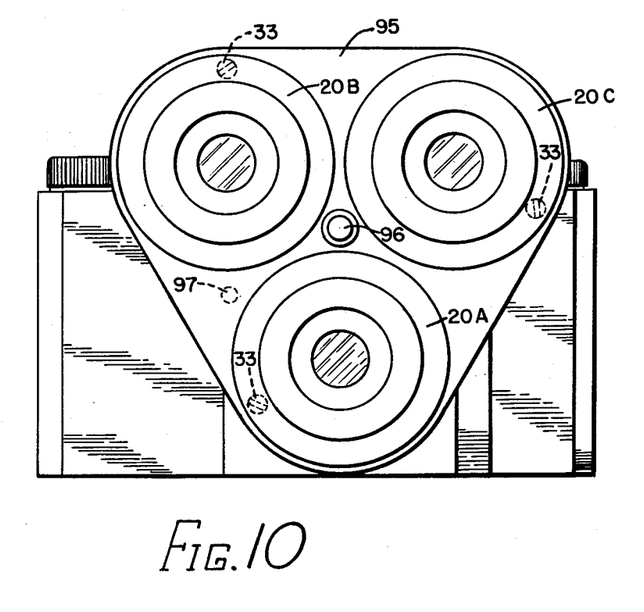
FIG. 10 is a front elevation of the form of construction shown in FIG. 9.

In the constructions described above, a single lens camera is contemplated, viz. a camera in which the lens may be readily removed and replaced by another lens, such as a lens of different focal length, the parts being so arranged that the operating mechanism carried by the camera body and the controls for said mechanism are equally adapted to operate the several interchangeably lenses. It is to be noted, however, that, due to the simplicity of the construction of the present invention, the several lenses may, instead of being removable from the camera, be carried by a turret and be brought into effective position one at a time for use. This aspect of the invention is illustrated in FIGS. 9 and 10 in which three lenses are shown indicated generally as 20A, 20B and 20C. These lenses are fixed to a turret plate 95 pivoted at 96 to the camera body. Each of these lenses is provided with operating mechanism including a shaft 32 similar to the one shown in FIG. 1 terminating in an arcuate tongue 32a engageable in an arcuate groove in the socket member 33. When a single lens is used, the center of the arcuate tongue and groove is in the center of the lens body 20 as appears from FIG. 2. However, when a plurality of lenses are mounted on a turret, the center of curvature of said arcuate tongue and arcuate groove is at the center of rotation of the turret namely at the pivot 96, as is clear from FIG. 10. It is, of course, obvious that the turret cannot be rotated on its axis unless the camera is in the open blade position since it is only in that position of the parts that the tongue 32a of the lens is in effective position so that it can slide out of the groove in the socket 33.

A suitable detent plunger 97 is provided in the camera body to cooperate with one of three equally spaced detent recesses in the back of the turret plate to assure that one of the lenses is in correctly aligned position. This detent plunger may be provided with a groove inside the housing which aligns with a part of the release mechanism when the detent plunger aligns with one of the three detent recesses. This prevents releasing the camera for an exposure unless one of the lenses is in correct position.

Figure 11:
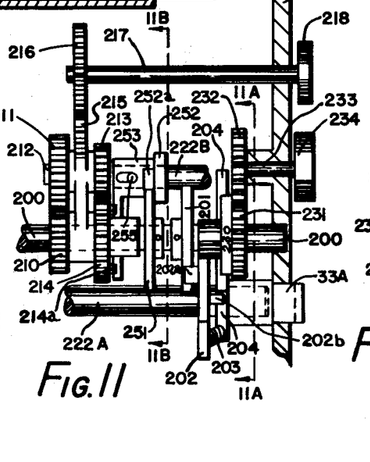
FIG. 11 is a side view, partly in section, of part of a modified form of construction in which the lens body is provided with separate shutter and diaphragm blades.
Figure 11A:
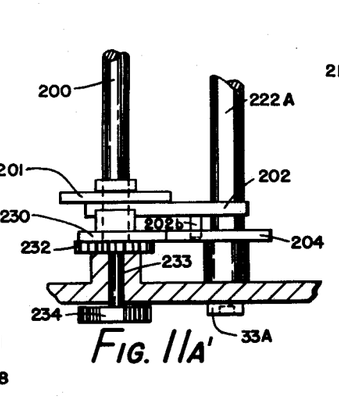
FIG. 11A is a cross-section taken on the line 11A—11A of FIG. 11.
Figure 11B:
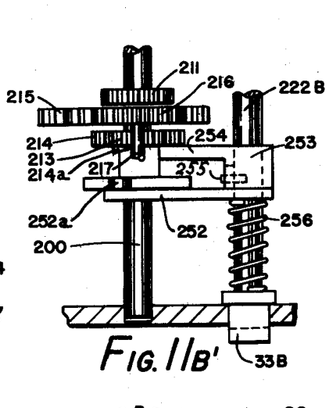
FIG. 11B is a cross-section taken on the line 11B—11B of FIG. 11.

In the forms of construction described above, the invention has been illustrated by means of mechanisms involving a single set of blades which perform the functions of diaphragm and shutter. In such embodiments, only one operating socket 33 is used to operate one shaft such as 32 in FIG. 1. In some cases it may be desirable to provide the customary individual sets of blades, one to serve as a diaphragm to determine the aperture and the other as shutter blades. FIGS. 11, 11A, 11A', 11B and 11B' illustrate this form of the invention. Referring to FIGS. 11A and 11B, the dotted line 20 indicates the lens body such as the lens body 20 of FIGS. 1, 2, 3 and 4. Located equi-distantly from the center of said lens body are two shafts 222A and 222B on which are mounted respectively socket 33A which serves to operate the diaphragm blades through a shaft such as shaft 32 of FIG. 1 and socket 33B which serves to operate the shutter blades through another shaft such as shaft 32. Both of said sockets 33A and 33B are operated by a single member such as shaft 200 which carries suitable cams and other operating means to give the desired motions to sockets 33A and 33B. Referring first to FIGS. 11, 11A and 11A', the diaphragm operating socket 33A is oscillated by the following mechanism:

Plate cam 201 is mounted on shaft 200 for rotation therewith. As appears from FIG. 11A, this is of full diameter except for the recess extending from about 315° to about 30°. Bearing against the edge of cam 201 is roller 202a carried on arm 202 loosely pivoted on shaft 222A. Arm 202 is biased clockwise as by spring 202e and carries a pin 202b which in the position shown in FIG. 11A bears against a shoulder 204a on aperture control arm 204 which arm is firmly attached to a sleeve journalled on shaft 222A and forming a rearward extension of socket 33A. Loosely mounted on shaft 200 is a spiral cam 230 to which is attached a gear 231 with which meshes the gear 232 carried on shaft 233 journalled in the housing 11. Mounted on shaft 233 outwardly of the casing is the graduated aperture control knob 234. It will be noted that rotation of knob 234 will cause rotation of cam 230 which therefore presents various radial distances in the path of arm 204.

Shaft 200 is given one complete rotation at each camera operation by means which may be similar to the means described for rotating shaft 40. As shaft 200 begins its rotation, arm 202 is moved counter-clockwise to its full extent. This permits counter-clockwise movement of arm 204 and socket 33A until arm 204 strikes the periphery of cam 230. In the position shown, this movement provides a large aperture (say f2.8). When arm 204 is arrested by cam 230, pin 202b is moved away from shoulder 204a and spring 203 is compressed. If the cam 230 had been rotated, say 45° counter-clockwise from the position shown in FIG. 11A, arm 204 would have been given a much greater counter-clockwise movement (in the diaphragm closing direction) so that a much smaller aperture, say f22, would have been provided. Toward the end of the rotation of shaft 200 from, say 330 to 360°, stud 202a drops into the recess in cam 201 thus permitting arm 202 to move clockwise to its full extent under the action of spring 202e. During this time, pin 202b pushing against shoulder 204a forces arm 204 clockwise to the fully opened diaphragm position shown in FIG. 11A. It is obvious that cam 201 might be of the type such as a box cam which would drive arm 202 positively in both directions.

The shutter operating mechanism, viz. the mechanism for operating socket 33B, requires merely that the shutter be normally fully open, then be fully closed while the mirror is swung to ineffective position, then be fully opened for a variable period, then be fully closed while the mirror is restored to effective position and then be again fully opened. To effect this movement, there is fixed to shaft 200 cam 251 having a conformation similar to the one shown in FIG. 11B. Engaged with the periphery of said cam is cam follower stud 252a carried by arm 252 attached to sleeve 253 to which is also attached arm 254. Shaft 222B carries a pin 255 located in a slot in sleeve 253 whereby shaft 222B is connected for rotation by arm 252 and sleeve 253 and limited relative axial movement is provided for. The assembly consisting of arm 252, sleeve 253 and arm 254 is biased rearwardly as by spring 256. Socket 33B is firmly connected to shaft 222B.

It will be apparent that as shaft 200 and cam 251 are rotated clockwise, the shutter operating assembly comprising arm 252, sleeve 253, arm 254, shaft 222B and socket 33B will first be rotated counter-clockwise to their full extent thus closing the shutter. Shortly after, say from 30 to 60°, these parts will be moved clockwise to the position shown in FIG. 11B, as by spring 254a, thus opening the shutter fully. Shutter closing to terminate the exposure takes place after a variable time as when one of the lugs 214a strikes the finger 254b on arm 254. This will cause the assembly, consisting of arm 254, sleeve 253, arm 252 and stud 252a, to move forwardly so that stud 252a is moved away from the periphery of cam 251 thus permitting the said assembly to rotate counter-clockwise to its full extent as under the action of spring 254a, closing the shutter blades and terminating the exposure.

Cam lugs 214a are carried on the front face of gear 214 mounted loosely on shaft 200. Said gear is engaged by planetary gear 213 connected through shaft 212 with planetary gear 211 which in turn meshes with gear 210 fixed to shaft 200. Shaft 212 is journalled in a planetary carrier segment 215 with which meshes gear 216 on shaft 217 journalled in the housing 11 and carrying externally of the housing the graduated exposure time setting knob 218. As explained with reference to FIGS. 7 and 8a, oscillation of carrier segment 215 will vary the angular relationship of gear 214 and therefore of cam lugs 214a relative to shaft 200 thus varying the time at which the exposure is terminated.

After shaft 200 and cam 251 have rotated about 315°, stud 252a will be aligned with a notch in the cam 251 thus permitting spring 256 to push the assembly rearward to the position shown in FIG. 11B'.

It will be noted that cam 251 could be of the positive type such as a box cam.

It will be noted that with the construction just described, the diaphragm and the shutter blades will be moved independently of each other in such a way as to provide a predetermined variable aperture and a predetermined variable exposure time, said operation being performed by a single member such as the shaft 200.

Figure 12:
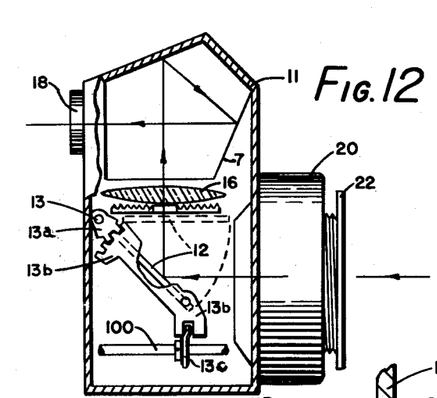
FIG. 12 is a vertical cross-sectional view of means for operating the mirror.

In the above description, it has sometimes been assumed that the mirror is spring operated in one direction to a position where it is held by a releasable catch. It may, however, be preferable in some cases to operate the mirror in both directions as by a cam on shaft 100 (or 200 or 40). This may be done by the operating means shown in FIG. 12 in which the shaft 100 (or 200 or 40) is provided with a cam 13c engaging segment 13b which meshes segment 13a on shaft 13 and causes the mirror 12 to be moved to ineffective position during the first 30 degrees of movement of shaft 100 (or 200 or 40) where it will be held until the shaft has moved 315° at which point the mirror will be returned to effective position between 315 and 360°. In this way, a positive co-relation will be maintained between the mirror positon and the position of the diaphragm-shutter blades and, if desired, shaft 100 (or 200 or 40) can be permitted to rotate 360° in a continuous motion leaving the mirror in effective position and leaving the diaphragm-shutter blades fully open at the end of the exposure operation. Thereafter the film transport mechanism would be operated.

In the above description, it was indicated that shaft 40 (or 100 or 200) was spring driven for one revolution at a time as by a spiral spring. It is to be understood that these shafts may also be rotated by means of an electric motor or other similar motive power.

It is sometimes desirable that the operator be able to close the diaphragm to desired extents during focusing so as to observe the effect of various apertures on depth of field. This can be easily done with the several forms of operating mechanism illustrated and described. Thus, an arm may be attached to tube 50 (FIG. 4) which extends to the outside of the casing 11 or other operating means be provided to rotate tube 50 momentarily. Similarly, means may be provided to oscillate arm 104 of FIGS. 7 and 8c or arm 204 of FIGS. 11, 11A and 11A' to reduce the aperture during focusing.

The invention is not intended to be limited to the several illustrative forms shown and described which are to be understood as illustrative only and not as limiting, as various changes in construction and arrangement may be made including combining features of the said forms, all coming within the scope of the claims which follow:

I claim:

1. Exposure control mechanism for photographic cameras of the type having a camera body containing means for supporting a photosensitive sheet and a lens body carried by the camera body and having a lens adapted to form on the photosensitive sheet an image of the object to be photographed, and which camera body contains a movable mirror which in normal position obstructs light from reaching the photosensitive sheet and reflects the light transmitted through said lens to the eye of the user for viewing and focusing, together with means for moving said mirror away from said light obstructing position and later back to light obstructing position, comprising the combination of a single set of fully closable light controlling blades supported within said lens body adjacent said lens, an oscillatable driven member within said lens body drivingly connected to said blades to close said blades when oscillated in one direction to a certain position and to move said blades toward open position when said driven member is oscillated in the other direction, the extent of opening of said blades being proportional to the extent of oscillation of said driven member, normally arrested motive power operated means within said camera body including means to move said mirror, and an oscillatable driving member in the camera body drivingly connected to said driven blade operating member carried by the lens body, said power operated means including means within the camera body for oscillating the oscillatable driving member and consequently the driven member to variable extents and in either direction in such a way that said driven member normally holds said blades in fully open position, then closes said blades fully, then opens said blades to an adjustable predetermined extent, then closes said blades fully and then opens said blades fully.

2. The combination according to claim 1 in which said means for oscillating said oscillatable driving member comprises a single rotatable cam and a cam follower, said cam follower being connected to drive said oscillatable driving member, and said cam being formed to move said cam follower and its connected driving member, driven member and blades in the manner described.

3. The combination according to claim 1 in which said means for oscillating said oscillatable driving member comprises a single rotatable cam and a cam follower, said cam follower being connected to drive said oscillatable driving member, together with spring means to bias said cam follower to open blade position, said cam being so formed as normally to permit said blades to be drawn to open position by said spring means and during cam rotation to force said blades to closed position.

4. The combination according to claim 1 in which said means for oscillating said oscillatable driving member comprises a single rotatable cam and a cam follower, said cam follower being connected to drive said oscillatable driven member, and said cam being so formed as normally to hold said blades in open position but to permit the closing of said blades at certain other times during its rotation, together with spring means to bias said cam follower toward closed blade position.

5. The combination according to claim 1 in which said means for oscillating said oscillatable driving member comprises a single rotatable cam and a cam follower, said cam follower being connected to drive said oscillatable driving member through a disengageable connection, together with spring means to bias said cam follower to open blade position and weaker spring means to bias said oscillatable driving member toward blade closed position, said cam being so formed as normally to allow said blades to be drawn to open position by said first mentioned spring means and during cam rotation to force said blades to closed position and thereafter to permit said blades to move toward open position, together with timing means for disengaging said connection between said cam follower and said oscillatable driving member at a predetermined time whereby the said weaker spring means is permitted to move said oscillatable driving member to close said blades to terminate the exposure even though said cam is in a position where it prevents movement of the cam follower to blade closed position.

6. The combination according to claim 5, in which the cam is so formed that on further movement it forces said cam follower to the fully closed position to permit re-engagement of the disengageable connection, and said cam is so formed that on still further movement it permits the cam follower and driving member to be moved to blade open position by said stronger spring means.

7. The combination according to claim 6 in which said timing means comprises a timing cam operated in unison with said first mentioned cam and means operated by said timing cam adapted to break said connection between the cam follower and the oscillatable driving member so that the weaker spring mentioned is free to oscillate the oscillatable driving member to blade closed position, and means for varying the angular relationship between the timing cam and the first mentioned cam.

8. The combination according to claim 7, in which said varying means comprises a circular serrated member in fixed angular relationship to the first cam and a mating serrated member in fixed angular relationship to the timing cam and means operated from the exterior of the camera body for varying the angular relationship of the two serrated members.

9. The combination according to claim 1, together with a spring biased to drive said power operated means, and pawl means normally arresting said power operated means but movable to release said power operated means at will, said pawl means being so formed that when moved to the releasing position it is in a position to again arrest said power operated means after a partial operation.

10. The combination according to claim 1, in which the power operated means comprises a rotatable member, a spring biased to drive said rotatable member, control means for normally holding said rotatable member against rotation but arranged to permit a single rotation thereof at will, one end of said spring being connected to drive said rotatable member and the other end being connected to a member rotatable about the axis of rotation of said rotatable member whereby the tension of said spring may be adjusted by rotatably adjusting the last mentioned rotatable member.

11. A combination according to claim 1, in which the power operated means comprises a rotatable member, a spring biased to drive said rotatable member through a one-way connection comprising a member co-axial with said rotatable member and connected thereto by sprag means, control means for normally holding said rotatable member against rotation but arranged to permit a single rotation thereof at will, one end of said spring being connected to drive said rotatable member through said co-axial member and said sprag means and the other end being connected to an abutment, and means for rotating said co-axial member reversely to rewind said spring.

12. The combination according to claim 1 in which said power operated means comprises a driven shaft, a cam mounted on said shaft for rotation therewith but slidable axially thereon, a cam follower bearing on said cam and actuated thereby, the bearing position on said cam being determined by the axial position of said cam on said shaft, said cam being formed to cause movement of said cam follower in such a way that the blades are first closed fully, then opened to a variable extent, the part of said cam which determines the extent of opening being of generally conical formation so that the extent of opening of the blades is determined by the axial position of said cam.

13. The combination according to claim 1 in which said oscillating driving member comprises a single rotatable cam and a cam follower, said cam follower being connected to drive said oscillatable driving member, together with means to bias said follower toward closed blade position, said cam being so formed as normally to hold said blades in open position and to cause said blades to be moved to closed position at certain other times, the driving connection between the cam follower and the oscillatable driving member being resiliently yieldable in the direction toward blade opening position and variable means for limiting oscillation of said oscillatable driving member to variably limit the extent of blade opening.

14. The combination according to claim 13 in which the said oscillation limiting means comprises a control arm attached to said oscillatable driving member and a rotarily adjustable spiral cam lying normally in the path of said control arm.

15. The combination according to claim 14 in which said control arm and cam are relatively movable in such a way that the cam is no longer in the path of the arm whereupon said yieldable connection is permitted to return to normal position to cause the blades to open fully, together with means for producing said relative movement.

16. The combination according to claim 1 in which said oscillating driving member comprises a single rotatable cam and a cam follower, said cam follower being connected to drive said oscillatable driving member, together with spring means to bias said follower to closed blade position, said cam being so formed as normally to hold said blades in open position and to cause said blades to be moved to closed position at certain other times, said cam and cam follower being relatively movable to interrupt the operative connection between them whereby said cam follower is freed to move to blade closed position to terminate the exposure.

17. The combination according to claim 16, together with variably settable timing means for interrupting said operative connection between the cam and cam follower to terminate the exposure after a variable interval.

18. The combination according to claim 17 in which said variably settable timing means comprises a cam for interrupting said operative connection between the first mentioned cam and the cam follower, said timing cam being rotated by planeary gearing having a sun gear driven in synchronism with the first mentioned cam, a sun gear of a larger diameter connected to drive said timing cam and connected planet gears supported on a planetary carrier and meshing with said sun gears respectively, the gear sizes being such that the second sun gear rotates at half the speed of the first sun gear, together with means for moving said carrier to vary the angular position of said second sun gear and timing cam relative to the first sun gear.

19. The combination according to claim 1 in which said oscillating driving member comprises a single rotatable cam and a cam follower, said cam follower being connected to drive said oscillatable driving member, said cam being formed to move said cam follower in such a way that the blades are closed, opened, closed and then opened and a second cam operated in unison with said first mentioned cam, a second cam follower moved by said second cam and connections from said second cam follower to said mirror to move the mirror to ineffective position just after the blades are closed the first time.

20. The combination according to claim 1 in which the lens body is removable from the camera body and in which clutch means are provided between the driving member in the camera body and the driven member in the lens body so constructed that the clutch is disengaged when the lens body is removed from the camera body and is reengaged when the lens body is attached to the camera body.

21. Exposure control mechanism for photographic cameras of the type having a camera body containing means for supporting a photosensitive sheet and a lens body carried by the camera body and having a lens adapted to form on the photosensitive sheet an image of the object to be photographed, comprising the combination of a set of light controlling blades supported within said lens body adjacent said lens, an oscillatable driven shaft within said lens body drivingly connected to move said blades an extent proportional to the motion of said driven shaft, normally arrested motive power operated means within said camera body, and an oscillatable driving shaft drivingly connected to said blade operating shaft carried by the lens body, said power operated means including means within the camera body for oscillating the oscillatable driving shaft and consequently the driven shaft and the blades in one direction when the said shafts are oscillated in a certain direction and for oscillating at another time said shafts and blades in the opposite direction.

References Cited in the file of this patent
UNITED STATES PATENTS

| | | |
|---|---|---|
| 524,670 | Rudolph et al. | Aug. 14, 1894 |
| 761,756 | Brueck | June 7, 1904 |
| 798,595 | Brueck | Sept. 5, 1905 |
| 2,472,586 | Harvey | June 7, 1949 |
| 2,527,780 | Willcox | Oct. 31, 1950 |
| 2,552,275 | Harvey | May 8, 1951 |
| 2,730,025 | Faulhaber | Jan. 10, 1956 |
| 2,900,885 | Gebele | Aug. 25, 1959 |
| 2,916,978 | Harter et al. | Dec. 15, 1959 |
| 2,969,007 | Groger | Jan. 24, 1961 |